United States Patent
Pinter et al.

(10) Patent No.: US 8,344,831 B2
(45) Date of Patent: Jan. 1, 2013

(54) MAGNETIC YOKE, MICROMECHANICAL COMPONENT AND METHOD FOR PRODUCING A MAGNETIC YOKE AND A MICROMECHANICAL COMPONENT

(75) Inventors: Stefan Pinter, Reutlingen (DE); Joerg Muchow, Reutlingen (DE); Juergen Kober, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 112 days.

(21) Appl. No.: 12/918,695

(22) PCT Filed: Dec. 4, 2008

(86) PCT No.: PCT/EP2008/066796
§ 371 (c)(1),
(2), (4) Date: Aug. 20, 2010

(87) PCT Pub. No.: WO2009/141021
PCT Pub. Date: Nov. 26, 2009

(65) Prior Publication Data
US 2011/0006866 A1  Jan. 13, 2011

(30) Foreign Application Priority Data
May 21, 2008  (DE) .......................... 10 2008 001 896

(51) Int. Cl.
*H01H 51/22*  (2006.01)
(52) U.S. Cl. .......................................... 335/78; 335/281
(58) Field of Classification Search ...................... 335/78
See application file for complete search history.

(56) References Cited

U.S. PATENT DOCUMENTS

| 4,777,464 | A | * | 10/1988 | Takabatashi et al. | ......... | 335/306 |
| 5,382,905 | A | * | 1/1995 | Miyata et al. | ................. | 324/319 |
| 5,864,275 | A | * | 1/1999 | Ohashi et al. | ................. | 335/306 |

(Continued)

FOREIGN PATENT DOCUMENTS
EP  0778657  6/1997

(Continued)

OTHER PUBLICATIONS

International Search Report, PCT International Patent Application No. PCT/EP2008/066796, dated Jul. 21, 2009.

*Primary Examiner* — Elvin G Enad
*Assistant Examiner* — Lisa Homza
(74) *Attorney, Agent, or Firm* — Kenyon & Kenyon LLP

(57) ABSTRACT

A magnetic yoke having a yoke core that has a magnet, on which a first yoke arm and a second yoke arm are developed in such a way that the magnet and the two yoke arms open up a yoke opening, and having a first pair of pole pieces, which extend into the yoke opening and are positioned at a distance to each other in a first direction in such a way that a first gap is developed between the first pair of pole pieces and having a second pair of pole pieces, which extend into the yoke opening and are positioned in a second direction, that is aligned perpendicular to the first direction, at a distance from each other in such a way that a second gap is developed between the second pair of pole pieces. A micromechanical component having such a magnetic yoke is also described. A method for producing a magnetic yoke and a micromechanical component is also described.

11 Claims, 8 Drawing Sheets

U.S. PATENT DOCUMENTS

| | | | |
|---|---|---|---|
| 5,942,962 A * | 8/1999 | Gery | 335/297 |
| 5,963,117 A * | 10/1999 | Ohashi et al. | 335/306 |
| 7,034,415 B2 * | 4/2006 | Turner et al. | 310/36 |
| 7,330,093 B2 * | 2/2008 | Asano et al. | 335/220 |
| 7,804,386 B2 * | 9/2010 | Yonnet et al. | 335/229 |
| 2004/0021924 A1 | 2/2004 | Yasuda | |
| 2006/0028310 A1 * | 2/2006 | Asano et al. | 335/220 |
| 2008/0001690 A1 * | 1/2008 | Yang et al. | 335/213 |

FOREIGN PATENT DOCUMENTS

| | | |
|---|---|---|
| GB | 2380065 | 3/2003 |
| JP | 57102005 | 6/1982 |
| WO | WO 2005/078506 | 8/2005 |
| WO | WO2005/078509 | 8/2005 |
| WO | WO2006/016081 A1 * | 2/2006 |

* cited by examiner

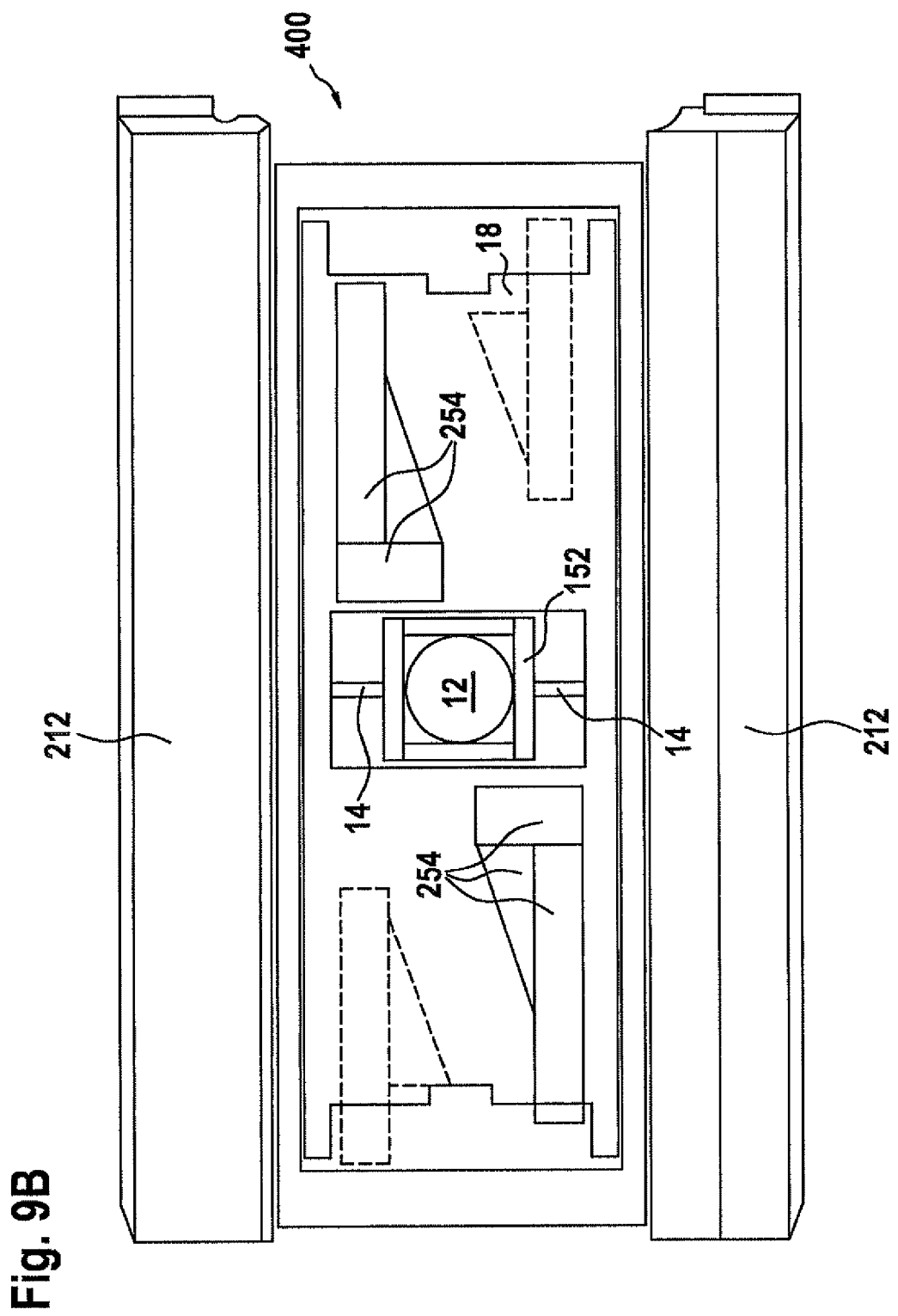

MAGNETIC YOKE, MICROMECHANICAL COMPONENT AND METHOD FOR PRODUCING A MAGNETIC YOKE AND A MICROMECHANICAL COMPONENT

FIELD OF THE INVENTION

The present invention relates to a magnetic yoke. The present invention also relates to a micromechanical component. In addition, the present invention relates to a method for producing a magnetic yoke and a micromechanical component.

BACKGROUND INFORMATION

For adjusting a control element, micromechanical components usually have a magnetic and/or electrostatic drive. Such a micromechanical component is a micromirror, for example, having a mirror disk that is able to be adjusted about two rotational axes.

If motions outside the plane are required, which is usual for micromirrors, higher rotational torques are able to be exerted on the control element, as a rule, using a magnetic drive. Whereas for the electrostatic power generation for adjusting the control element, frequently voltages of over 100 V are required, a comparable magnetic drive uses clearly lower voltages, which may be provided by a standard electronic system. Further advantages of a magnetic drive, compared to an electrostatic drive, are the force generation that is linear in a first approximation and the negligible risks of an arc-over or a pull-in.

Examples for a magnetic drive for adjusting a control element of a micromechanical component are described in European Patent No. EP 778 657 B1 and in PCT Application No. WO 2005/078509 A2. The magnetic drives described have at least two permanent magnets, however, which have to be arranged at a certain distance from one another. Because of the repelling forces of the permanent magnets, problems frequently arise when the magnetic drives are put together.

SUMMARY

According to the present invention, it is possible, by developing a flux-conducting layer of a soft magnetic material, to rotate the direction of the flux lines of a magnetic field. The development of a magnetic yoke, having at least two pairs of pole pieces which are at a distance from one another in different directions, thus makes possible a local rotation of the direction of the flux lines of a magnetic field built up by the magnetic yoke.

Consequently, in the first gap a first magnetic field is present, whose flux lines are directed in parallel to the first direction. By contrast, the second magnetic field has flux lines in the second gap, which are directed in parallel to the second direction.

One substantial advantage of an example embodiment of the present advantage is that, for the generation of a magnetic field having perpendicular components of the aligned flux lines with respect to the first direction, one is able to omit the use of several magnets. Consequently, those problems also drop out which usually come about when putting together a magnetic drive based on the different polarity of the magnets, and the mutual repulsion connected with that.

Furthermore, an example embodiment of the present invention includes a local rotation of the magnetic field by at least two pairs of pole pieces. This permits the production of a micromechanical component having such a magnetic yoke, which is easier and more cost-effective to accomplish.

Therefore, the present invention may present an easily executed possibility of producing a cost-effective magnetic drive that is developed to adjust a control element of a micromechanical component.

In one advantageous specific embodiment, the first pair of pole pieces and/or the second pair of pole pieces are situated at a distance from the yoke arms. This opens up a further simplification of the assembly, and a clearly improved adjusting accuracy, since parts of the flux-conducting layers are able to be integrated in one process on the wafer plane. In a photolithographic process, tolerances may be achieved down to one µm, while normal assembly processes have a tolerance of at least 100 µm.

In particular, the first pair of pole pieces may have tapering at its regions adjoining the first gap, and/or the second pair of pole pieces may have tapering at its regions adjoining the second gap. This permits a local increase in the field strength of the magnetic field.

In one specific embodiment, the micromechanical component includes a current control device which provides a current, having a first frequency, to the first current path and a current, having a higher second frequency, to the second current path. This permits a resonant adjustment of the control element about a first rotational axis, and a quasi-static adjustment of the control element about a second rotational axis.

In this context, the first current path and the second current path may be connected to an overall supply line, a high-pass filter being preconnected to the second current path. Thus, instead of two supply lines, only one overall supply line has to be guided via springs. This leads to an improved flexural strength of the spring.

In another preferred specific embodiment, the first current path, the second current path, the control element, the first pair of pole pieces and/or the second pair of pole pieces are enclosed by an encapsulation which is situated at least partially in the yoke opening. The components enclosed by the housing are thus protected from environmental influences.

The advantages described above may also be ensured by a suitable production method. In one advantageous specific embodiment, the forming of the first yoke arm and the second yoke arm may include the following steps: Filling of a U-profile with a nonmagnetic material; and drilling and/or milling a recess into the U-profile to subdivide the U-profile into metal strips of which the yoke arms are formed. The drilling or milling of the recess permits establishing the distance between the two yoke arms with great accuracy, in this instance.

The construction of the micromechanical device is advantageously able to occur separately from the magnet. Because of that, standard machines may be used during assembly, wire bonding, etc. Soft magnetic parts may be easily integrated into the assembly, since at this stage they are still nonmagnetic. Only at the end is the entire, already packaged micromechanical unit set onto the magnet (using two soft magnetic pole shoes).

BRIEF DESCRIPTION OF THE DRAWINGS

Additional features and advantages of the present invention are explained in greater detail below, with reference to the figures.

FIGS. 9A to 9C show a schematic illustration of an additional specific embodiment of the micromechanical component.

DETAILED DESCRIPTION OF EXAMPLE EMBODIMENTS

Figure 1:
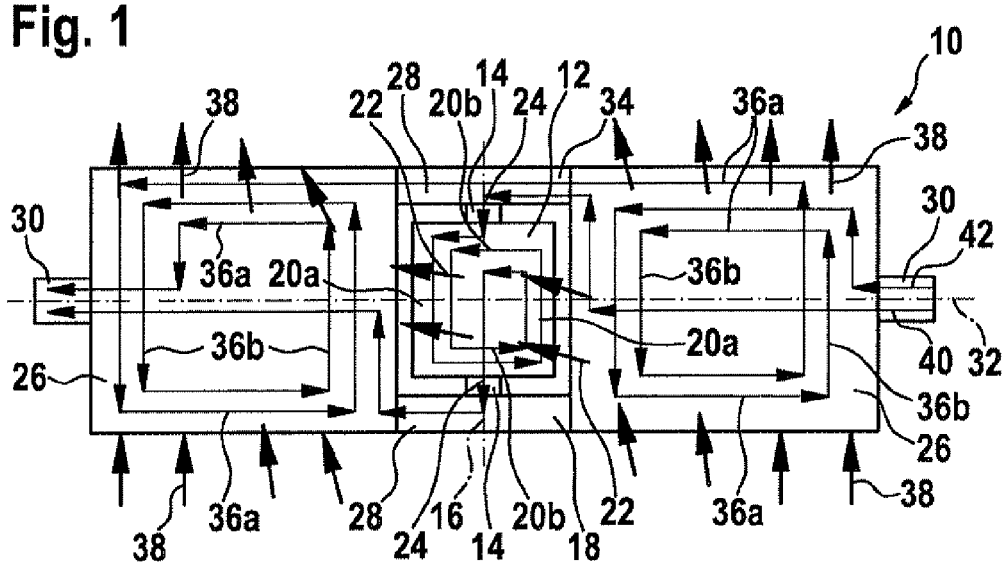
FIG. 1 shows a top view onto a first specific embodiment of a chip device of the micromechanical component.

FIG. 1 shows a top view of a first specific embodiment of a chip device of the micromechanical component. Chip device 10 has a mirror disk 12 as a adjustable control element. Mirror disk 12 is preferably coated with a reflecting material. On two opposite sides of mirror disk 12, a torsion spring 14 is developed in each case. The two torsion springs 14 run along a first rotational axis 16 of mirror disk 12. Mirror disk 12 is connected to an inner frame 18 via the two torsion springs 14.

In the specific embodiment shown in FIG. 1, mirror disk 12 is able to have a mirror diameter of 1 to 2 mm. The two torsion springs 14 preferably have a length of about 500 μm. The expansion of inner frame 18 along first rotational axis 16 may amount to 2 to 5 mm. The expansion of inner frame 18 in the direction perpendicular to first rotational axis 16 may amount to between 8 to 15 mm, for example.

To adjust mirror disk 12 with respect to inner frame 18, an inner coil system is developed on mirror disk 12, for instance, on one of the sides opposite the reflecting layer. The inner coil system is able to be produced, for example, by coating mirror disk 12 with a conductive layer and by subsequently patterning the conductive layer. The inner coil system is able to be subdivided into current paths 20a, which run parallel to first rotational axis 16 and current paths 20b, which are directed perpendicular to first rotational axis 16. Current paths 20a that are directed parallel to first rotational axis 16 are frequently designated as effective current paths. In contrast, current paths 20b, which are aligned perpendicular to first rotational axis 16, do not contribute to adjusting mirror disk 12 about first rotational axis 16.

In order to adjust mirror disk 12 about first rotational axis 16, there must be a magnetic field having magnetic flux lines 22 perpendicular to first rotational axis 16 during a current flow through the inner coil system. The Lorentz force in this case acts to adjust mirror disk 12 by rotating torsion springs 14. The Lorentz force thus counteracts the spring force of torsion springs 14. The direction of rotation is established by the direction of the current flowing through the inner coil system. The angle of inclination, by which mirror disk 12 is adjusted with respect to inner frame 18, depends on the strength of the current.

The supply of power to the inner coil system using current paths 20a and 20b takes place via leads 24, which are guided via torsion springs 14. Further details on supplying power to the inner coil system are described more accurately below.

Inner frame 18 includes two side plates 26, which are connected to each other using two connecting crosspieces 28. Mirror disk 12 is situated in a space between the two connecting crosspieces 28. The torsion springs 14 each run between a connecting crosspiece 28 and mirror disk 12.

Inner frame 18 is connected to an outer frame (not shown) using two springs 30. Each of the two springs 30 runs between the outer frame and an adjoining side plate 26. The two springs 30 run along a second rotational axis 32, which is able to be aligned perpendicular to first rotational axis 16. Inner frame 18 is able to be adjusted with respect to the outer frame about second rotational axis 32 by rotating spring 30.

In order to adjust inner frame 18 with respect to the outer frame, each of the two side plates 26 has an outer coil system. The two outer coil systems are connected to each other via a connecting line 34, which is guided via a connecting crosspiece 28. Each of the two outer coil systems includes current paths 36a, which run parallel to second rotational axis 32, and current paths 36b, which are directed perpendicular to second rotational axis 32. Current paths 36a that are parallel to second rotational axis 32 may be designated as effective current paths. In contrast, current paths 36b, that run perpendicular to second rotational axis 32, do not contribute to adjusting inner frame 18 with respect to the outer frame. They are therefore frequently designated as ineffective current paths.

During the supplying with current of the two outer coil systems using current paths 36a and 36b, if there is present a magnetic field having flux lines 38 that run perpendicular to second rotational axis 32, the Lorentz force has the effect of rotating inner frame 18 about second rotational axis 32. Mirror disk 12 that is connected to inner frame 18 is also rotated about second rotational axis 32, in this context.

Two supply lines 40 and 42 are guided via each of the two springs 30. Each of supply lines 40 runs from the outer frame via a spring 30, a side plate 26 and a connecting crosspiece 28 to a line 24. Supply lines 40 use this to supply the inner coil systems with current. By contrast, supply lines 42 are developed to make possible supplying current to the two outer coil systems. The coil systems are preferably developed in such a way that effective current paths 20a and 36a lie as far as possible from the associated rotational axes 16 and 32.

It is advantageous, in chip device 10, to set mirror disk 12 into oscillation at a frequency about rotational axis 16 which corresponds to the natural frequency of mirror disk 12. By contrast, the adjustment of inner frame 18 with respect to the outer frame about rotational axis 32 takes place quasi-statically. The frequency of the current signal that is conducted through the outer coil systems may thereby be clearly lower. One may designate this as resonant adjusting of mirror disk 12 about first rotational axis 16, and as quasi-static adjusting of mirror disk 12 about second rotational axis 32. For example, mirror disk 12 is adjusted about first rotational axis 16 at a resonant frequency of ca. 20 kHz. The quasi-static adjusting of mirror disk 12 about second rotational axis 32 is performed at ca. 60 Hz. The current signals are provided to the coil systems, for example, by a current control device.

In order to adjust mirror disk 12 about the two rotational axes 16 and 32, it is advantageous to have a magnetic field having flux lines 22 that are aligned perpendicular to first rotational axis 16, in the region of the inner coil system. At the same time, in the regions of the outer coil systems, there should be a magnetic field having flux lines 38 that are aligned perpendicular to the second rotational axis 32. The simultaneous adjustment of mirror disk 12 about the two rotational axes 16 and 32, that are aligned as much as possible perpendicular to each other, thus requires an overall magnetic field whose flux lines 22 are aligned in an inner region perpendicular to flux lines 38 of two outer regions. Possibilities for setting up such an overall magnetic field having flux lines 22 and 38 will be discussed in greater detail below.

Figure 2:
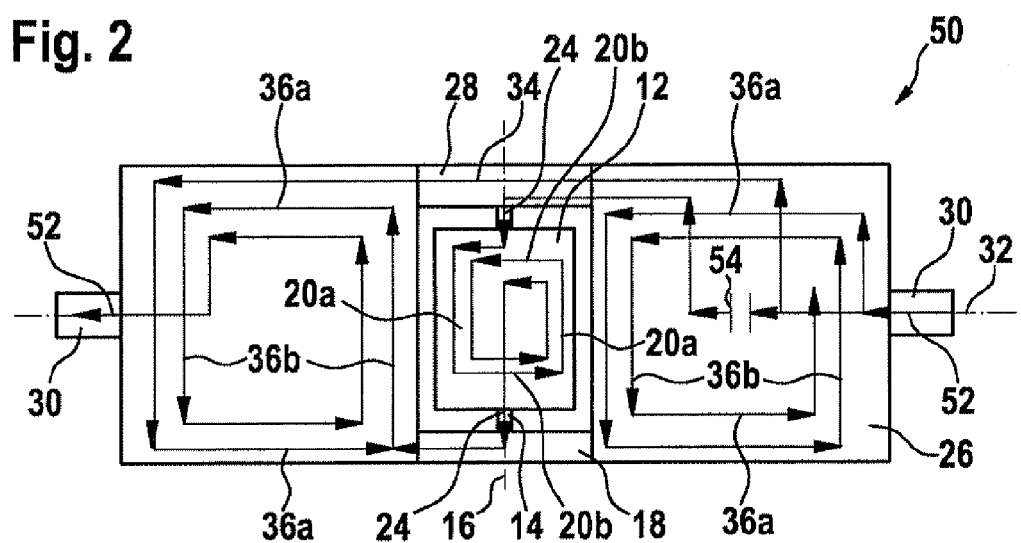
FIG. 2 shows a top view onto a second specific embodiment of the chip device of the micromechanical component.

FIG. 2 shows a top view of a second specific embodiment of the chip device of the micromechanical component.

The chip device 50 shown has the components 12, 14, 18, 20a, 20b, 24 to 30, 34, 36a and 36b, that have already been described. In contrast to the chip device described with reference to FIG. 1, only one overall supply line 52 is guided via each of the two springs 30. The current signals are conducted via overall supply lines 52 to the two outer coil systems and to the inner coil system.

In chip device 50, mirror disk 12 is rotated via a resonant adjusting about the first rotational axis 16. The rotating of mirror disk 12 about second rotational axis 32 is done by quasi-static adjustment. Since the current signals of the coil systems are provided using current paths 20a, 20b, 36a and 36b over overall supply lines 52, it is advantageous to separate the rapid frequencies on chip device 50 from the slow frequencies. This is implemented via a high-pass filter 54. High-pass filter 54 is preferably made up of the inductance and the resistance of the coil itself and an additional capacitance, which are connected together in a suitable manner. High-pass filter 54 lets pass only high frequencies. For instance, a capacitance used as a high-pass filter 54 is able to be implemented by a combination of base/emitter, emitter/metal, polysilicon/oxide/polysilicon, polysilicon/oxide/metal, polysilicon/oxide/silicon or metal/oxide/metal.

Consequently, chip device 50 has the advantage over the exemplary embodiment described above that only one supply line, namely, overall supply line 52, is situated on springs 30. Thus, springs 30 may be executed to be narrower, and thus easier to bend. In particular, in chip device 50, the flexural strength of springs 30 is impaired only by the one overall supply lines 52. Since overall supply line 52 is able to have the same properties as the supply lines that were described above, a more advantageous flexural strength of springs 30 is assured. This makes possible a simpler adjustment of inner frame 18 with respect to the outer frame.

Figure 3:
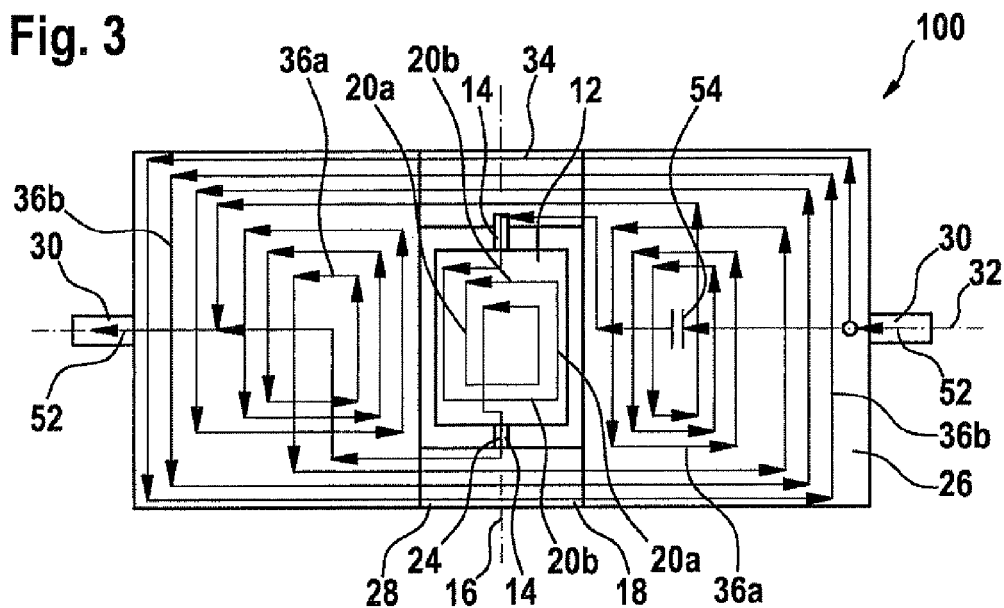
FIG. 3 shows a top view onto a third specific embodiment of the chip device of the micromechanical component.

FIG. 3 shows a top view of a third specific embodiment of the chip device of the micromechanical component.

Chip device 100 includes components 12, 14, 18, 20a, 20b, 24 to 30, 34, 36a and 36b, 52 and 54 that have already been described above. However, in the case of chip device 100, the outer coil systems are developed as an outer overall coil system having several lines 34 guided via connecting crosspieces 28 and using current paths 36a and 36b.

The two connecting crosspieces 28 have a comparatively large width, in order to enable as large a number as possible of lines 34 to be situated on them. The surfaces of the two side plates 26 are preferably equipped with as large a number as possible of current paths 36a and 36b.

Above all, lines 34, which run parallel to second rotational axis 32 and which have a comparatively great distance from second rotational axis 32, contribute significantly to the increase in the torque for adjusting inner frame 18 about second rotational axis 32. This makes easier the adjusting of inner frame 18 with respect to the outer frame (that is not sketched).

Figure 4:
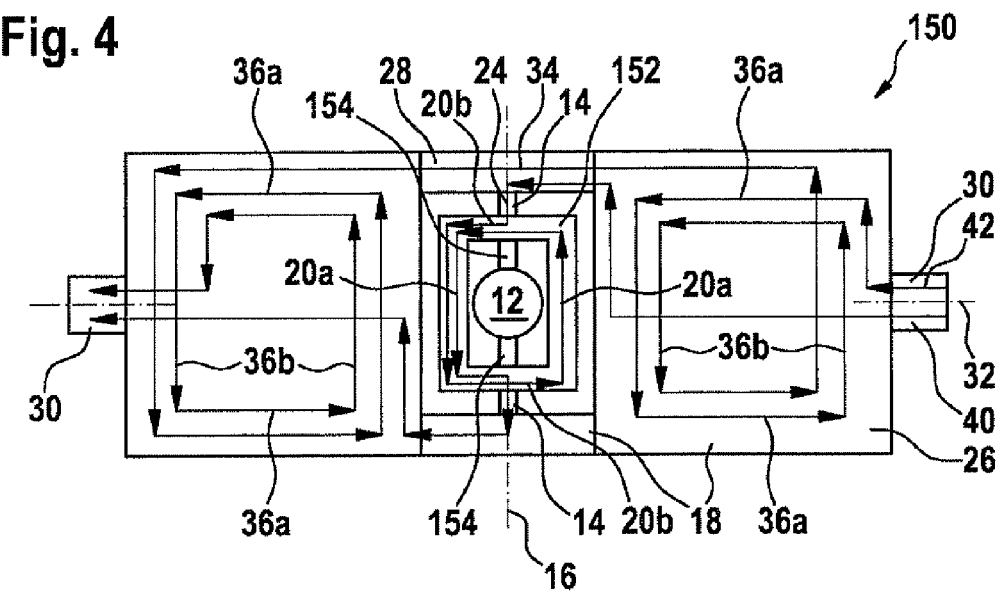
FIG. 4 shows a top view onto a fourth specific embodiment of the chip device of the micromechanical component.

FIG. 4 shows a top view of a fourth specific embodiment of the chip device of the micromechanical component.

In the case of chip device 150, too, mirror disk 12 is rotated via a resonant adjustment about first rotational axis 16 and via a quasi-static adjustment about second rotational axis 32. In this context, it is advantageous for mirror disk 12 to have as high as possible a natural frequency.

The natural frequency of mirror disk 12 for adjusting mirror disk 12 about first rotational axis 16 is established by the mass of mirror disk 12 and the spring constant of torsion spring 14. In this context, the equation applies, that the square of the natural frequency is equal to the quotient of the spring constant of torsion spring 14 divided by the moment of inertia of mirror disk 12. In order to implement as high as possible a natural frequency of mirror disk 12, it is thus advantageous if mirror disk 12 has as small a mass as possible.

However, an inner coil system which is rigidly situated on mirror disk 12, significantly increases the overall mass, of the inner coil system and mirror disk 12, which is to be set in oscillation. In addition, mirror disk 12 should have a minimum size, so that reliably situating the inner coil system on it is assured.

Therefore, a spatial separation of the inner coil system from mirror disk 12 is of advantage. In chip device 150, the spatial separation of the inner coil system from mirror disk 12 is implemented in that a central frame 152 is developed around mirror disk 12 within inner frame 18. The inner coil system is preferably situated exclusively on central frame 152. Central frame 152 is fastened rotatably on connecting crosspieces 28, using torsion springs 14. Two additional torsion springs 154 run along first rotational axis 16, between central frame 152 and mirror disk 12. Consequently, the oscillations of mirror disk 12 are built up via the oscillations of central frame 152, when mirror disk 12 is adjusted about first rotational axis 16.

An additional advantage of chip device 150 is that current paths 20a, that are developed in parallel to first rotational axis 16 on central frame 152, are at a comparatively great distance from first rotational axis 16. This makes possible an increase in the torque.

Figure 5:
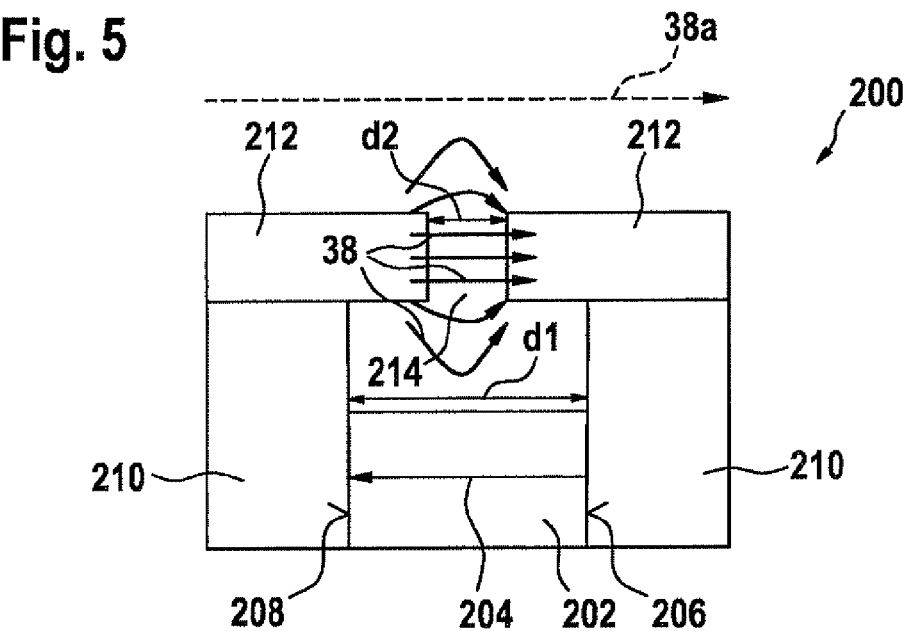
FIG. 5 shows a schematic illustration of a first specific embodiment of a magnetic yoke of the micromechanical component.

FIG. 5 shows a schematic illustration of a first specific embodiment of a magnetic yoke of the micromechanical component.

Magnetic yoke 200, reproduced schematically, has a hard magnet 202 that has a direction of magnetization 204. The magnetization of hard magnet 202 may also take place after the assembly of magnetic yoke 200. The magnetization of hard magnet 202 is preferably carried out after the assembly of magnetic yoke 200 in the associated micromechanical component.

Hard magnet 202 forms the yoke core of magnetic yoke 200. Naturally, the yoke core does not have to be formed completely of a hard magnetic material. Instead, only a part of the yoke core may be built up of hard magnet 202.

Direction of magnetization 204 of hard magnet 202 runs from a first side surface 206 of hard magnet 202 to a second side surface 208 of hard magnet 202. At the two side surfaces 206 and 208, yoke arms 210 are fastened. Soft magnets are used, for example, as yoke arms 210. A shape made of epoxide or another nonmagnetic material may also be created for yoke arms 210, which is filled with a soft magnetic material.

The two yoke arms 210 are at a distance d1 from each other, which corresponds to the width of soft magnet 202 between the two side surfaces 206 and 208. Hard magnet 202 is fastened at the lower regions of the side surfaces of yoke arms 210. The two yoke arms 210 extend away from hard magnet 202 in a direction perpendicular to direction of magnetization 204. Together with hard magnet 202, yoke arms 210 open up a yoke opening.

At each surface of a flux-conducting layer, a pole shoe 212 is situated. Pole shoes 212 may be made of a soft magnetic material, for example. Pole shoes 212 may be developed in one piece with yoke arms 210.

The two pole shoes 212 form a first pair of pole shoes. In a first direction 38a, which runs in parallel to the direction of magnetization 204, the pole shoes are situated at a distance from each other so that there is a gap 214 between the two pole shoes 212. The distance d2 between the two pole shoes 212 is equal to the width of gap 214. Distance d2 is preferably less than distance d1.

There is a magnetic field within gap 214. Flux lines 38 of the magnetic field run within gap 214, parallel to direction 38a and to direction of magnetization 204. They are directed opposite to direction of magnetization 204. The schematically reproduced magnetic field having flux lines 38 within gap 214 is used for adjusting the inner frame of a chip device about the second rotational axis, that was described above. The chip device, in this context, which corresponds, for instance, to one of the chip devices described above, or a combination of these, is fastened in gap 214.

In order to adjust a control element of the chip device about the rotational axis that is directed perpendicular to the second rotational axis, within gap 214 a partial magnetic field should be set up whose flux lines are perpendicular to flux lines 38. Examples for generating such a magnetic field are described in greater detail below.

Figure 6:
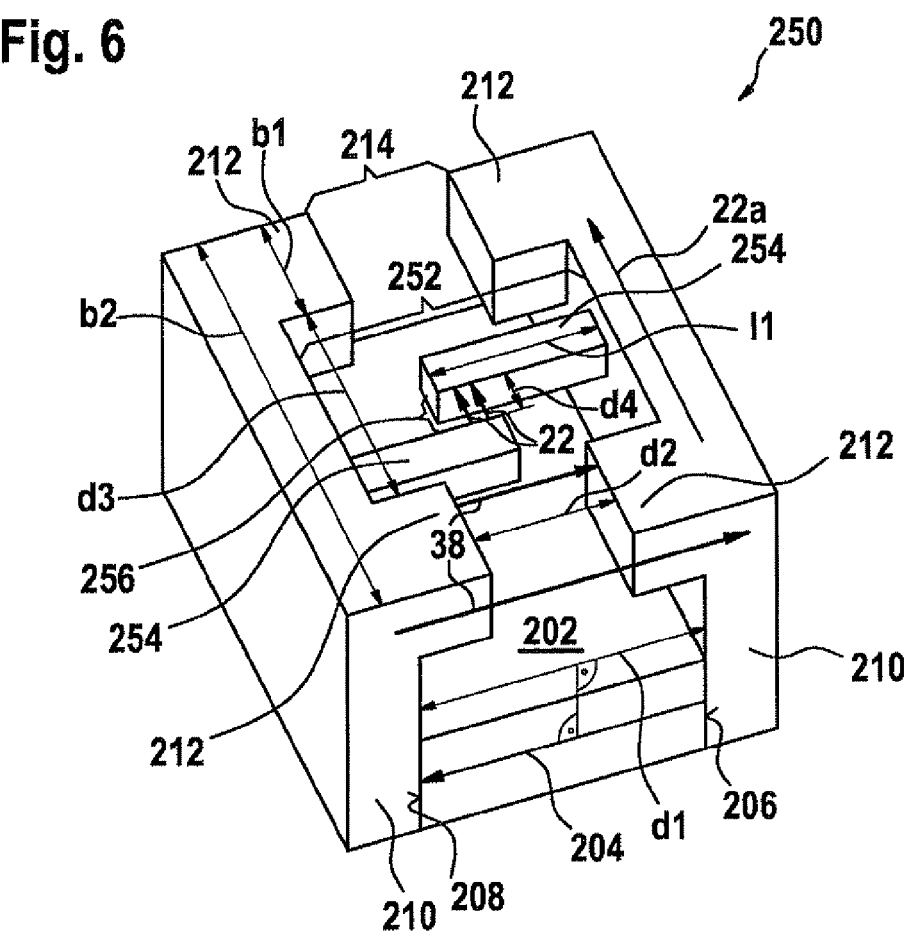
FIG. 6 shows a three-dimensional view of a second specific embodiment of the magnetic yoke of the micromechanical component.

FIG. 6 shows a top view onto a second specific embodiment of the magnetic yoke of the micromechanical component.

Magnetic yoke 250 includes hard magnet 202 having the direction of magnetization 204 and the two yoke arms 210. In addition, magnetic yoke 250 has four pole shoes 212. Each of the four pole shoes 212 has a width b1 parallel to the upper side of yoke arms 210, which is less than one-half of a width b2 of a flux-conducting layer 210 parallel to its upper side. The width b1 of a pole shoe 212 may approximately correspond to the width of the side plate, described above, of a chip device.

Two pole shoes 212 each are associated with one flux-conducting layer 210. There is preferably a contact between the two pole shoes 212 and the flux-conducting layer associated with them. The two pole shoes 212 may be developed in one piece with flux-conducting layer 210 associated with them. The flux-conducting layer not associated with the two pole shoes 212 is at a distance from them.

The two pole shoes 212 are preferably situated on the opposite sides of associated flux-conducting layer 210. The two pole shoes 212 are thus at a distance d3 from each other in a direction 38a.

In magnetic yoke 250, two pole shoes 212, which are associated with different yoke arms 210, form an outer yoke. The two pole shoes 212 of an outer yoke are opposite to each other at distance d2. Magnetic yoke 250 includes two outer yokes.

Accordingly, magnetic yoke 250 has two outer gaps 214 and a middle gap 252. The dimensions of the two outer gaps 214 are distance d2 and width b1. The dimensions of middle gap 252 are able to be distance d1 and distance d3. The overall size of magnetic yoke 250 having the outer yokes and the inner yoke may be less than one cubic centimeter.

In outer gaps 214, which are associated with the outer yokes, there is a magnetic field whose flux lines 38 run parallel to direction 38a and to direction of magnetization 204. Flux lines 38 of the magnetic field run opposite to direction of magnetization 204. Using the magnetic field having flux lines 38 in outer gaps 214, the inner frame, described above, of a chip device, fastened in gaps 214 and 252, is able to be adjusted with respect to the outer frame about the second rotational axis. To do this, the chip device is positioned in such a way that the outer coil systems at least extend into outer gaps 214.

In gap 252, an inner yoke is formed having two pins 254. In this context, the pins form a second pair of pole pieces. The two pins 254 are preferably situated in inner gap 252 in such a way that their longitudinal direction extends in parallel to the direction of magnetization 204. The maximum length 11 of a pin 254 is able to be longer than half of distance d1. Each of the two pins 254 is situated closer to a different flux-conducting layer 210.

The two pins 254 overlap partially in direction 38a, and at their overlapping area they are apart by a distance d4 in a direction 22a. In a preferred manner, direction 22a is perpendicular to direction 38a. Between the two pins 254 there is thus an inner gap 256, having a width equal to distance d4. Distance d4 is preferably clearly smaller than distance d3.

The two pins 254 are made of a material that has good flux-conducting properties. Therefore, in inner gap 256 there is a magnetic field whose flux lines 22 run as perpendicular as possible to field 214 in direction 22a, as may be seen in FIG. 6. Flux lines 22 are thus aligned at an angle unequal to 0° and unequal to 180° to flux lines 38. Flux lines 22 are preferably aligned perpendicular to flux lines 38. Consequently, it is possible, using only the one hard magnet 202 having direction of magnetization 204, to implement an overall magnetic field whose flux lines 22 and 38 are aligned perpendicular to one another in locally bounded regions. The overall magnetic field is thus locally rotated by an angle of 90°.

The magnetic field having flux lines 22, present between pins 254, may be used to adjust the mirror disk of a chip device about the first rotational axis. In order to do this, the chip device, which may be developed to be similar to the chip devices described above, is fastened in magnetic yoke 250 in such a way that the inner coil system extends at least partially into the space between pins 254. The chip device is preferably held only by the yoke made up of the two pins 254. This ensures good thermomechanical decoupling. Pins 254 may, in addition, be situated at a minimum distance from associated flux-conducting layer 210. This improves the thermomechanical decoupling. At the same time, using pole shoes 212, the chip device is protected from a lateral offset or from being rotated.

Since only the one hard magnet 202 is required for producing magnetic yoke 250 having the implementable flux lines 22 and 38, when magnetic yoke 250 is put together, no mutual repulsion forces of several magnets have to be overcome. This simplifies the production of magnetic yoke 250 as compared to usual magnetic drives. In addition, there is the possibility of installing hard magnet 202 in magnetic yoke 250 in an unmagnetized state, and to magnetize it only after assembly into a micromechanical component, using an outer magnetic field.

In addition, it is possible to fill gaps 214 and 252 with nonmagnetic materials. Examples of appropriate materials and their use will be described in greater detail below.

Figure 7:
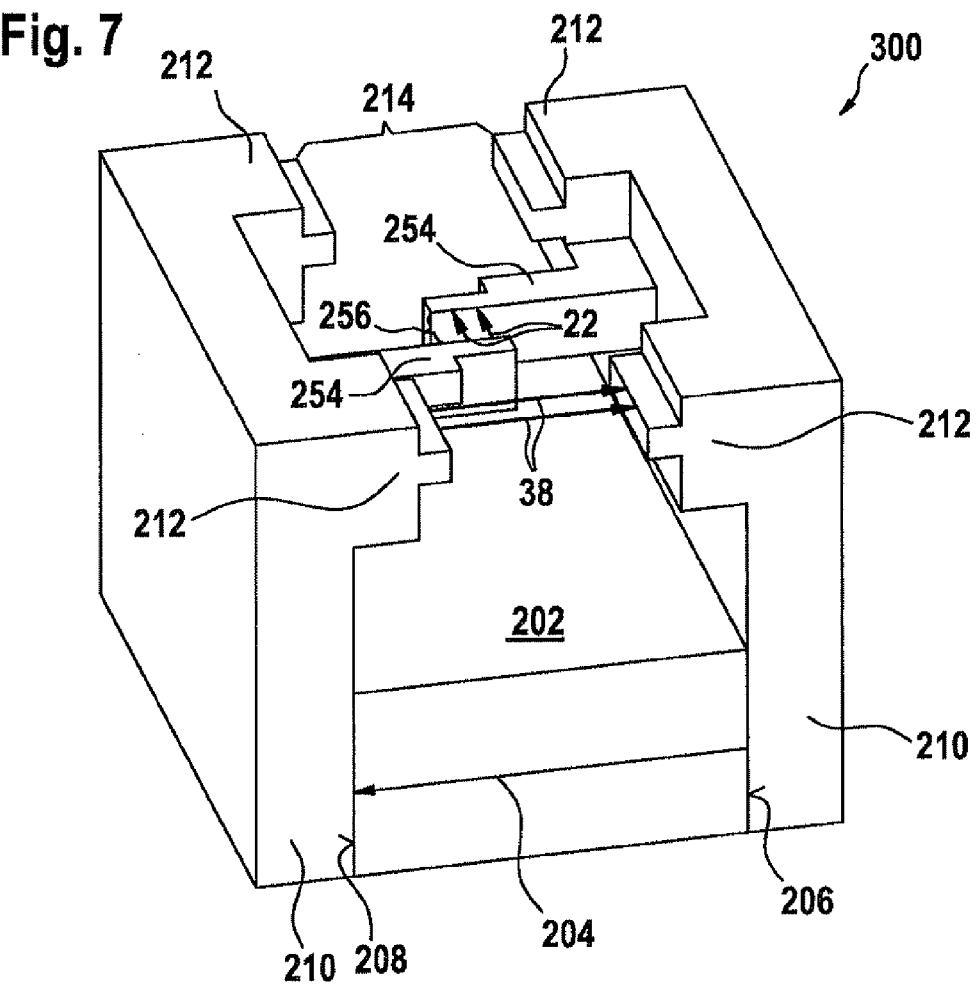
FIG. 7 shows a three-dimensional view of a third specific embodiment of the magnetic yoke of the micromechanical component.

FIG. 7 shows a side view of a third specific embodiment of the magnetic yoke of the micromechanical component.

Based on a modification of pole shoes 212, magnetic yoke 300 assures increased field strengths of the magnetic fields in gaps 214 and 256. It differs from the abovementioned specific embodiment by the tapering of pole shoes 212 and pins 254 at the ends extending into gap 214. To make it simpler, the tapering on pole shoes 212 and pins 254 are shown in the form of stairs in FIG. 7.

On the other hand, it is more advantageous to develop continuous tapering on pole shoes 212 and pins 254. Increased field strengths for the desired magnetic fields may be achieved especially by developing peaks.

The angle of deflection of an adjustable mirror disk is a linear function of the field strength of the magnetic field, the number of windings of the coil system, the strength of the current flowing through the coil system and the average distance of the coil system from a rotational axis. An increased field strength is thus particularly advantageous.

A deflection of at least 7° may be achieved by a tapering of pole shoes 212 and pins 254, at a number of windings of 30 of a coil system, and at a current through the coil system having a strength of 70 mA, at an overall width of the inner frame of 3 mm. At a frame width of 6 mm, a current strength of 70 mA and a winding number of 15, a magnetic field of 0.4 Tesla may be achieved in the outer region and one of 0.1 Tesla in the inner region.

Figure 8A:
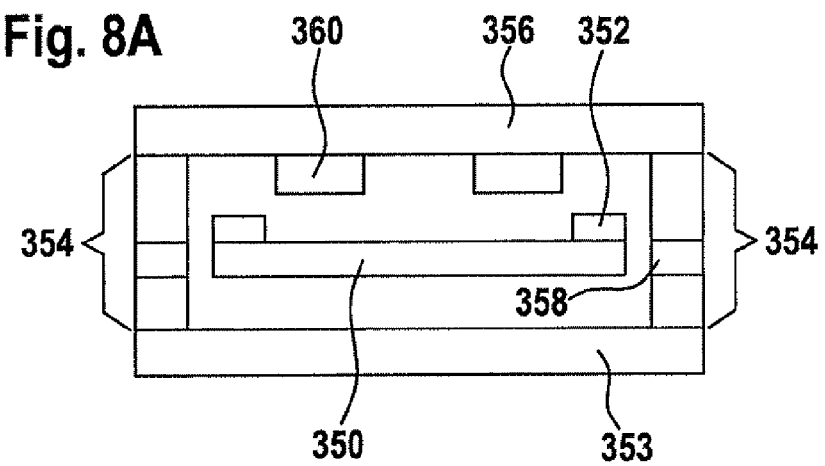
FIGS. 8A and 8B show a schematic illustration of an additional specific embodiment of the micromechanical component.
Figure 8B:
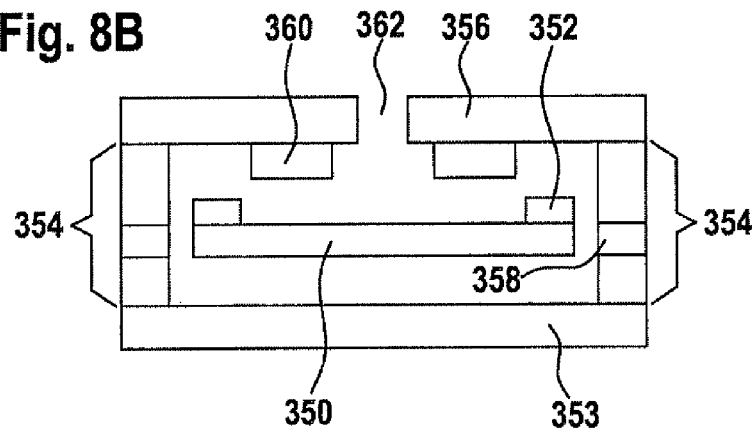

FIGS. 8A and 8B show schematic representations of a further specific embodiment of the micromechanical component, soft magnets being in the encapsulation.

The micromechanical component has a chip device 350 which is equivalent, for instance, to one of the chip devices described above with reference to FIGS. 1 through 4, or a combination of these. Chip device 350 includes an adjustable control element, an inner coil system, torsion springs and springs. However, in FIGS. 8A and 8B, only coils 352 of the outer coil system are shown, for the sake of greater clarity.

Chip device 350 is located in a housing developed as an encapsulation, which is made up of a bottom plate 353, two sidewalls 354 and a glass plate 356 developed as a cover plate. Chip device 350 is preferably developed in one piece with at least one section 358 of sidewalls 354. The mirror disk, the torsion springs, the springs and sections 358 are etched out of a common silicon layer, for example. Before or after the etching out, a conductive coating may be applied onto the silicon layer and be appropriately patterned for producing coils 352.

Before fastening glass plate 356 to sidewalls 354, soft magnets 360, that are fastened to glass plate 356, may be produced. To do this, for example, glass plate 356 is at least partially coated with a material having good flux-conducting properties. A suitable material is iron, for example. Thereafter, the coating of glass plate 356 may be patterned, using a suitable etching method, in such a way that soft magnets 360 are present in a suitable form. Glass plate 356, having soft magnets 360, may subsequently be fastened to sidewalls 354 by seal glass bonding, for example.

The encapsulation formed from components 353 through 356, along with chip device 350 situated in it and soft magnets 360, may be fastened in a gap of a magnetic yoke (that is not sketched). The magnetic yoke includes a hard magnet, yoke arms and pole shoes which are developed in such a way that, in the regions of the outer coil systems having coils 252, there is a magnetic field having magnetic flux lines aligned in a first direction. The magnetic yoke corresponds to the outer magnetic yokes described with reference to FIGS. 5 through 7, for example.

One may achieve the rotation of the magnetic field by soft magnets 360 that are situated on the inside of the encapsulation. The magnetic field is rotated, in this context, so that, in the region of the inner coil system, there is a magnetic field whose directional lines are directed in a second direction perpendicular to the first direction. Consequently, soft magnets 360 are aligned so that they create a smaller yoke that is aligned orthogonally to the outer yoke.

Since the magnetic field of a magnetic yoke is strongest at the poles, it is advantageous to bring the inner yoke as close as possible to the current paths of the resonant axis of chip device 350. This can be done most simply by integrating soft magnets 360 into a component of the encapsulation of chip device 350. The integration of magnets 360 onto or into a component of the encapsulation improves the stability of soft magnets 360. The application of magnets 360 onto glass plate 356, for example, assures flexural protection for soft magnets 360. Consequently, soft magnets 360 are able to exhibit a fine structure. A direct contact to the yoke is of advantage for achieving a maximum magnetic field, to be sure, but, in this case too, sufficiently great field strengths are obtained, since the magnetic field will, for the most part, skip over to the soft magnetic section.

In addition, sn integration of soft magnets 360 into the encapsulation, made up of components 353 through 356, assures a lesser risk of damage to soft magnets 360. Soft magnets 360 are thus protected from environmental influences.

The requirements are often high for evenness and roughness of the surface of the mirror disk. In addition, temperatures that frequently occur in current semiconductor processes are able to impair the quality of the surface of the mirror disk. It is therefore advantageous if depositing a reflecting layer on the mirror disk, such as of aluminum or silver, takes place only during a later step in the process sequence. By forming an opening 362 in glass plate 356, as shown in FIG. 8B, there exists the possibility of carrying out the depositing onto the mirror disk developed on chip device 350 towards the end of the production method. Opening 362 may subsequently be closed, so that one may set a specified pressure on the inside of the encapsulation, and protect chip device 350 and soft magnets 360 from environmental influences.

Figure 9A:
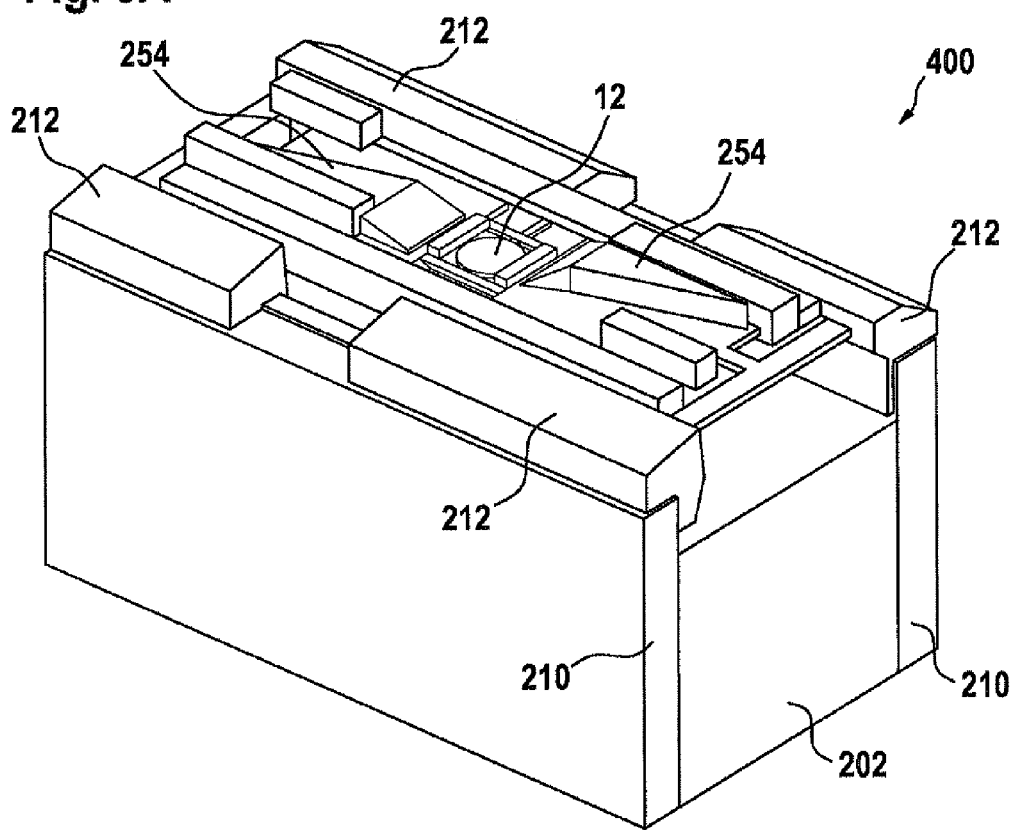
Figure 9C:
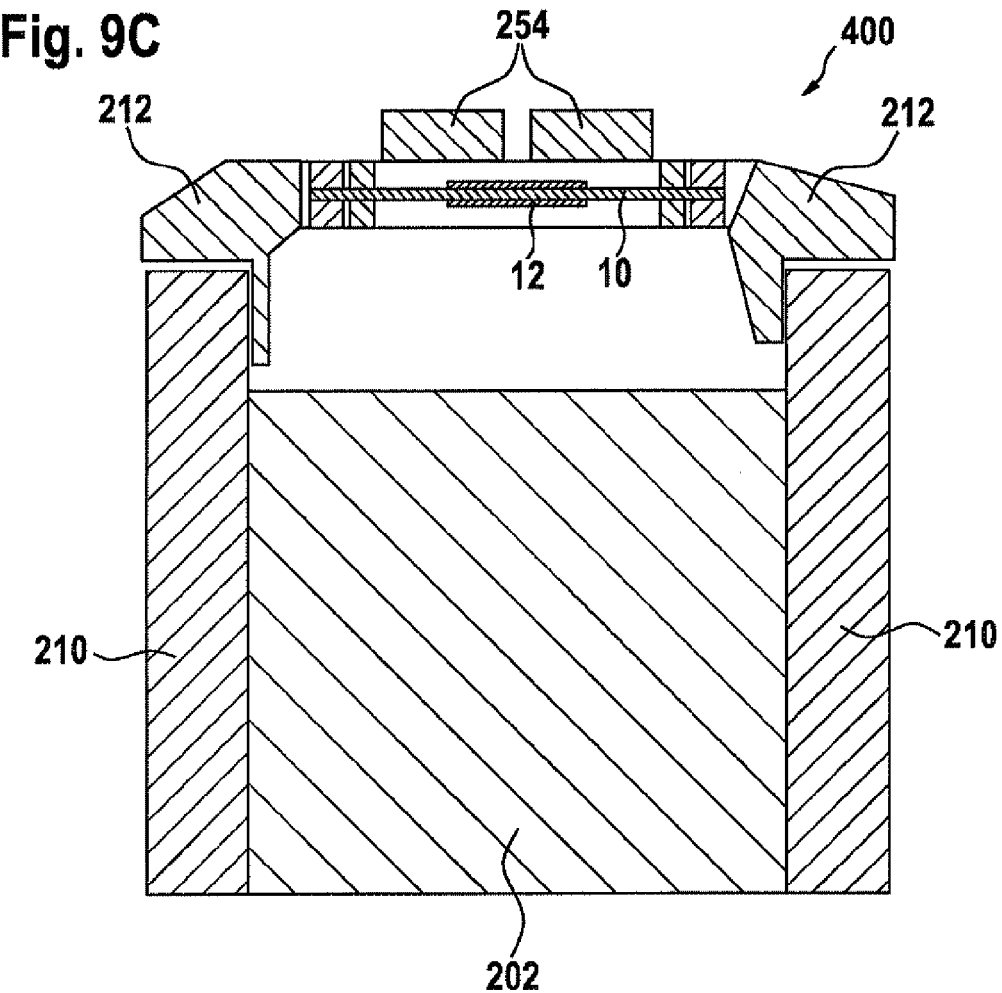

FIGS. 9A to 9C show a side view, a top view and a cross section of a further specific embodiment of the micromechanical component.

Micromechanical component 400 shown has the components that have been described above. We shall therefore omit repeating the description of these components.

Chip device 10 is clamped in between the two outer yokes. Thus the outer coil system lies centrically in the regions of maximum magnetic field strength. The magnetic field has a field strength of 0.4 Tesla, for example, in the vicinity of the coils. This assures a quasi-static adjustment of the inner frame about the second rotational axis (not sketched).

Based on the high field strength of the magnetic field in gaps 214, the outer coil systems may have a comparatively low number of windings. This reduces the internal resistance of the outer coil system.

The width of pole shoes 212 is able to correspond to the dimensions of the outer coil systems. This additionally assures a spatially constant magnetic field in the vicinity of the outer coil systems.

As may be seen in FIGS. 9A and 9B, magnets 254 have a triangular shape. Because of the triangular shape of magnets 254, the magnetic field is locally rotated in its direction about an angle greater than 0° up to a maximum of 90°.

FIGS. 10A through 10E show cross sections and a side view to show a specific embodiment of the production method for a micromechanical component.

Figure 10A:
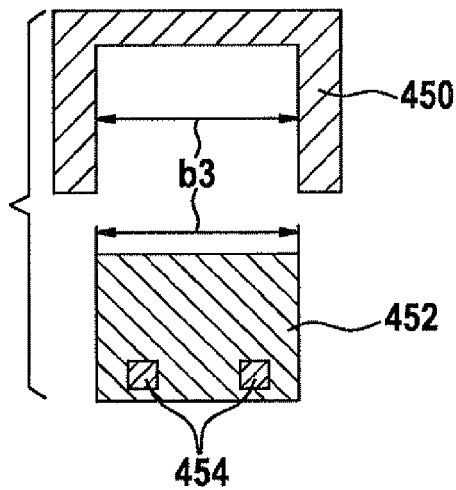
FIGS. 10A to 10E show cross sections and a side view to show a specific embodiment of the production method for a micromechanical component.

FIG. 10A shows a cross section through two component parts 450 and 452 for producing the micromechanical component, before its assembly. Component parts 450 and 452 involve a U-profile 450 made of a material having good flux-conducting properties and an epoxy profile 452.

U-profile 450 is made at least partially of a material having good flux-conducting properties. U-profile 450 may be made of iron, for example. The epoxy profile, or rather any nonmagnetic material 452, may have the shape of a right parallelepiped. Epoxy profile 452 is preferably shaped so that it has a width b3, which corresponds to the dimension of the recess in U-profile 450. Width b3 is between 3 and 5 mm, for example. Epoxy profile 452 has a length perpendicular to width b3, which is preferably clearly longer than width b3. As will be discussed in greater detail below, an advantageous length of epoxy profile 452 enables the production of a plurality of magnetic yokes at the same time.

Instead of epoxy profile 452, another profile made of a nonmagnetic material may also be used. In addition, the profile used instead of epoxy profile 452 may be formed from a nonmagnetic material. Examples of a corresponding material are plastic, glass and/or ceramics (or rather, all except those of Fe and Ni and a few rare earths). The use of a nonconductice material, in this context, enables the integration of contacts 454 in the profile.

Figure 10B:
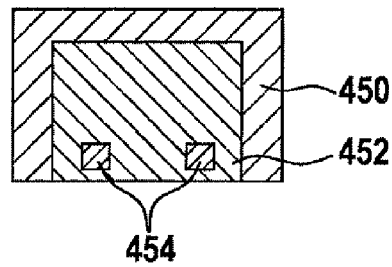

The two component parts 450 and 452 are fit together. The two component parts 450 and 452 are adhered to each other, for example. The result is shown in FIG. 10B.

As an alternative to the method step described with reference to FIGS. 10A and 10B, the material used for epoxy profile 452 may also be extruded into profile 450. This also assures a firm fitting together of the two component parts 450 and 452 to form a preferred overall profile.

Figure 10C:
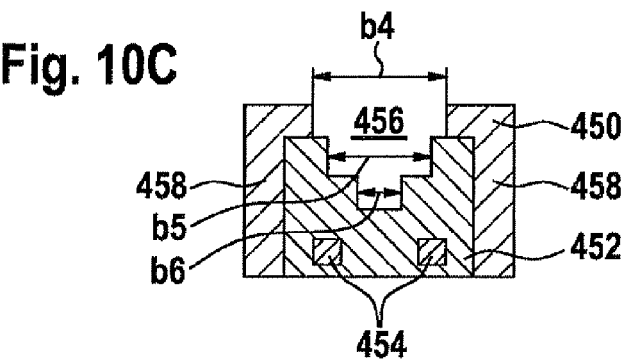

FIG. 10C shows a cross section through the two profiles 450 and 452 after drilling and/or milling a recess 456. Recess 456 extends through the connecting part of U-profile 450 into epoxy profile 452. Because of the formation of recess 456, U-profile 450 is subdivided into two free-standing metal strips 458. Free-standing metal strips 458 form the poles of the magnetic yokes produced afterwards.

Alternatively, all other methods of adhering, welding, etc. parts together are used, in which the yoke may be milled free, since the smallest tolerances are able to be achieved by milling.

Recess 456 may have tapering at its lower region. Recess 456 has an upper width b4, for example, a middle width b5 and a lower width b6. The tapering of recess 456 having middle width b5 and lower width b6 are preferably in epoxy profile 452. In the taperings of recess 456, chip devices may be fixed in an additional method step. Upper width b4 may amount to between 0.5 and 2 mm, for example. Middle width b5 and lower width b6 are adjusted accordingly.

In order to be able to position the printed circuit traces developed on the chip device as closely as possible to the poles of the magnetic yoke, it is advantageous to tolerance the distance between the poles as well as possible, and to position the chip device just as advantageously. The distance between the poles should have tolerances that are as low as possible, in this instance. By drilling and/or milling recess 456, one may assure the establishment of the distance apart having tolerances of at most 10 µm. Thus, it is possible to establish the distance between the two free-standing metal strips 458 at an accuracy of 10 µm. In addition, by establishing the distance between the two free-standing metal strips 458 via drilling and/or milling, a minimum production variance is assured in the magnetic yokes produced later. At the same time, great dimensional accuracy and good symmetry 10 of recess 456 are yielded.

Figure 10D:
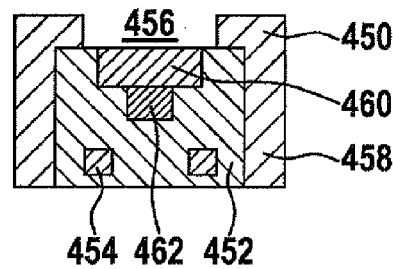

After the drilling and/or milling, chip devices 460 and 462 are able to be fixed in recess 456. The fixing of chip devices 460 and 462 takes place by adhesion, for example. One may also stack chip devices 460 and 462, in this instance. Thus a plurality of systems may be constructed in the longitudinal direction of the profile. The result is shown in FIG. 10D.

Chip device 460 may correspond, for instance, to one of the chip devices described above, or to a combination of these. Components for controlling chip device 460 may be integrated on chip device 462.

Figure 10E:
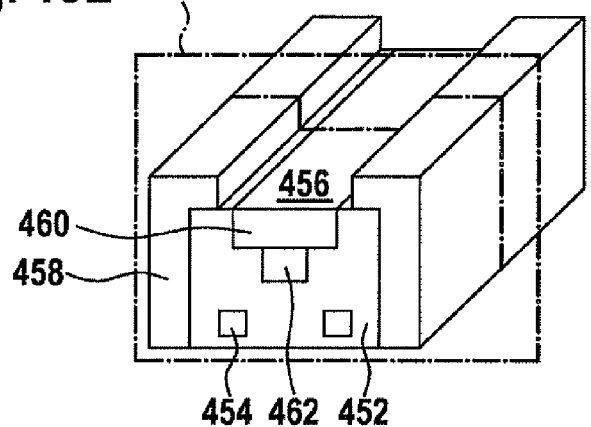

FIG. 10E shows a side view so as to show the separation of profiles 450 and 452 into a plurality of individual systems. The development of a sectional plane 464 is performed via known separating methods, in this context.

In the upper paragraphs, the pole pieces are designated as pins. A shape similar to pins is advantageous for the pole pieces. The present invention is not limited to pin-like pole pieces, however. In addition, the present invention is described in the upper paragraphs with the aid of a control element developed as an adjustable mirror disk. The present invention, however, is not restricted to an adjustable mirror disk. Instead of the mirror disk, the micromechanical component having the magnetic drive may also have a different control element.

The invention claimed is:

1. A magnetic yoke, comprising:
   a yoke core having a magnet on which a first yoke arm and a second yoke arm are developed so that the magnet and the two yoke arms open up a yoke opening;
   a first pair of pole pieces, which extend into the yoke opening and are situated at a distance from each other in a first direction in such a way that a first gap is situated between the first pair of pole pieces; and
   a second pair of pole pieces, which extend into the yoke opening and are situated at a distance from each other in a second direction perpendicular to the first direction in such a way that a second gap is situated between the second pair of pole pieces.

2. The magnetic yoke as recited in claim 1, wherein at least one of the first pair of pole pieces and the second pair of pole pieces are situated at a distance from the yoke arms.

3. The magnetic yoke as recited in claim 1, wherein at least one of i) the first pair of pole pieces has taperings at its regions adjacent to the first gap, and ii) the second pair of pole pieces has taperings at its regions adjacent to the second gap.

4. A micromechanical component, comprising:
   a magnetic yoke including a yoke core having a magnet on which a first yoke arm and a second yoke arm are developed so that the magnet and the two yoke arms open up a yoke opening, a first pair of pole pieces, which extend into the yoke opening and are situated at a distance from each other in a first direction in such a way that a first gap is situated between the first pair of pole pieces, and a second pair of pole pieces, which extend into the yoke opening and are situated at a distance from each other in a second direction perpendicular to the first direction in such a way that a second gap is situated between the second pair of pole pieces;
   at least one first flux line positioned in the first gap of the magnetic yoke in such a way that the first flux line is rotated about a first rotational axis because of a Lorentz force when there is a current flowing through the first flux line;
   at least one second flux line positioned in the second gap of the magnetic yoke in such a way that the second flux line is rotated about a second rotational axis because of a Lorentz force when there is a current flowing through the second flux line; and a control element which is coupled to the first flux line and to the second flux line in such a way that the control element is rotated about the first rotational axis when the current flows through the first flux line, and when the current flows through the second flux line it is rotated about the second rotational axis.

5. The micromechanical component as recited in claim 4, wherein the micromechanical component includes a current control device which provides a current having a first frequency to the first flux line and a current having a higher second frequency to the second flux line.

6. The micromechanical component as recited in claim 5, wherein the first flux line and the second flux line are connected to an overall supply line, and wherein a high-pass filter is preconnected to the second flux line.

7. The micromechanical component as recited in claim 6, wherein at least one of the first flux line, the second flux line, the control element, the first pair of pole pieces, and the second pair of pole pieces are enclosed by an encapsulation which is situated at least partially in the yoke opening.

8. A method for producing a magnetic yoke, comprising:
    forming a yoke core having a magnet;
    forming a first pair of pole pieces which extend into the yoke opening, the first pair of pole pieces being positioned at a distance from each other in a first direction in such a way that a first gap is situated between the first pair of pole pieces; and
    forming a second pair of pole pieces which extend into the yoke opening, the second pair of pole pieces being positioned at a distance from each other in a second direction that is perpendicular to the first direction, in such a way that a second gap is situated between the second pair of pole pieces.

9. The method as recited in claim 8, wherein the forming of the yoke core includes filling a U-profile with a nonmagnetic material; and
    at least one of drilling and machining a recess into the U-profile to subdivide the U-profile into metal strips from which the yoke core is formed.

10. A method for producing a micromechanical component, comprising:
    producing a magnetic yoke, the producing including forming a yoke core having a magnet, forming a first pair of pole pieces which extend into the yoke opening, the first pair of pole pieces being positioned at a distance from each other in a first direction in such a way that a first gap is situated between the first pair of pole pieces and forming a second pair of pole pieces, which extend into the yoke opening, the second pair of pole pieces being positioned at a distance from each other in a second direction that is perpendicular to the first direction, in such a way that a second gap is situated between the second pair of pole pieces;
    positioning at least one first current path in the first gap of the magnetic yoke in such a way that the first current path is rotated about a first rotational axis because of a Lorentz force when there is a current flowing through the first current path;
    positioning at least one second current path in the second gap of the magnetic yoke in such a way that the second current path is rotated about a second rotational axis because of a Lorentz force when there is a current flowing through the second current path; and
    coupling a control element to the first current path and to the second current path in such a way that the control element is rotated about the first rotational axis when the current flows through the first current path, and when the current flows through the second current path it is rotated about the second rotational axis.

11. A micromechanical component, the micromechanical component formed according to the steps of:
    producing a magnetic yoke, the producing including forming a yoke core having a magnet, forming a first pair of pole pieces which extend into the yoke opening, the first pair of pole pieces being positioned at a distance from each other in a first direction in such a way that a first gap is situated between the first pair of pole pieces, and forming a second pair of pole pieces which extend into the yoke opening, the second pair of pole pieces being positioned at a distance from each other in a second direction that is perpendicular to the first direction, in such a way that a second gap is situated between the second pair of pole pieces;
    positioning at least one first current path in the first gap of the magnetic yoke in such a way that the first current path is rotated about a first rotational axis because of a Lorentz force when there is a current flowing through the first current path;
    positioning at least one second current path in the second gap of the magnetic yoke in such a way that the second current path is rotated about a second rotational axis because of a Lorentz force when there is a current flowing through the second current path; and
    coupling a control element to the first current path and to the second current path in such a way that the control element is rotated about the first rotational axis when the current flows through the first current path, and when the current flows through the second current path it is rotated about the second rotational axis.

\* \* \* \* \*